Patented Sept. 28, 1954

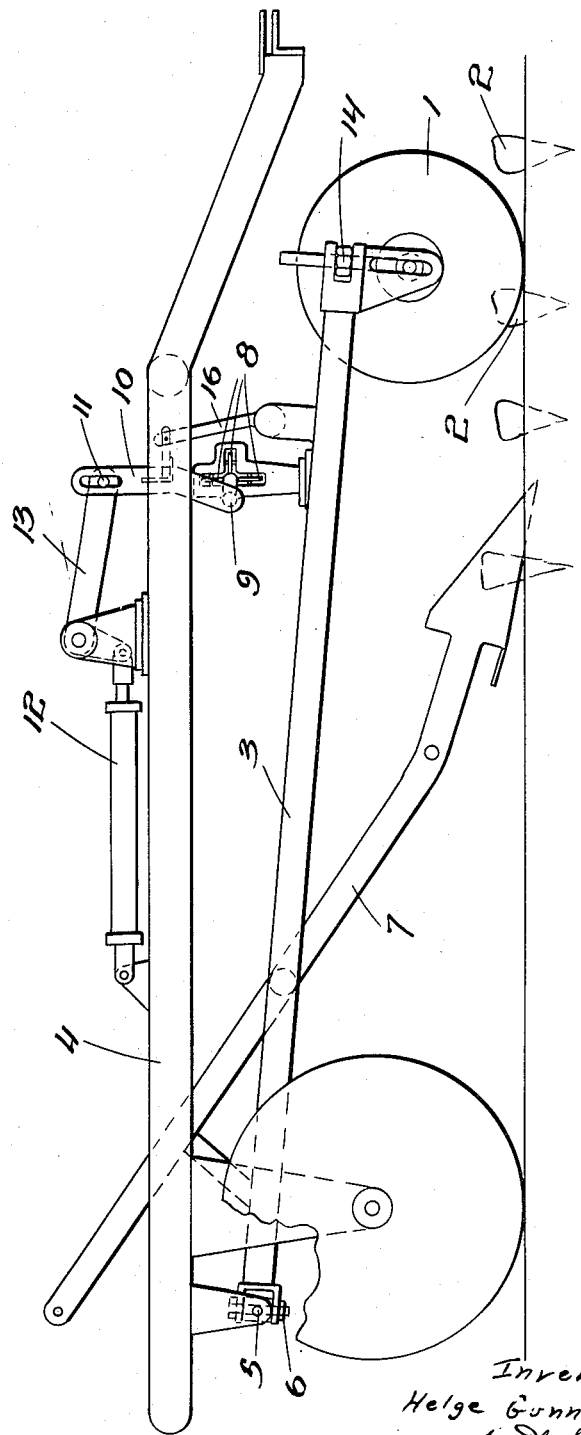

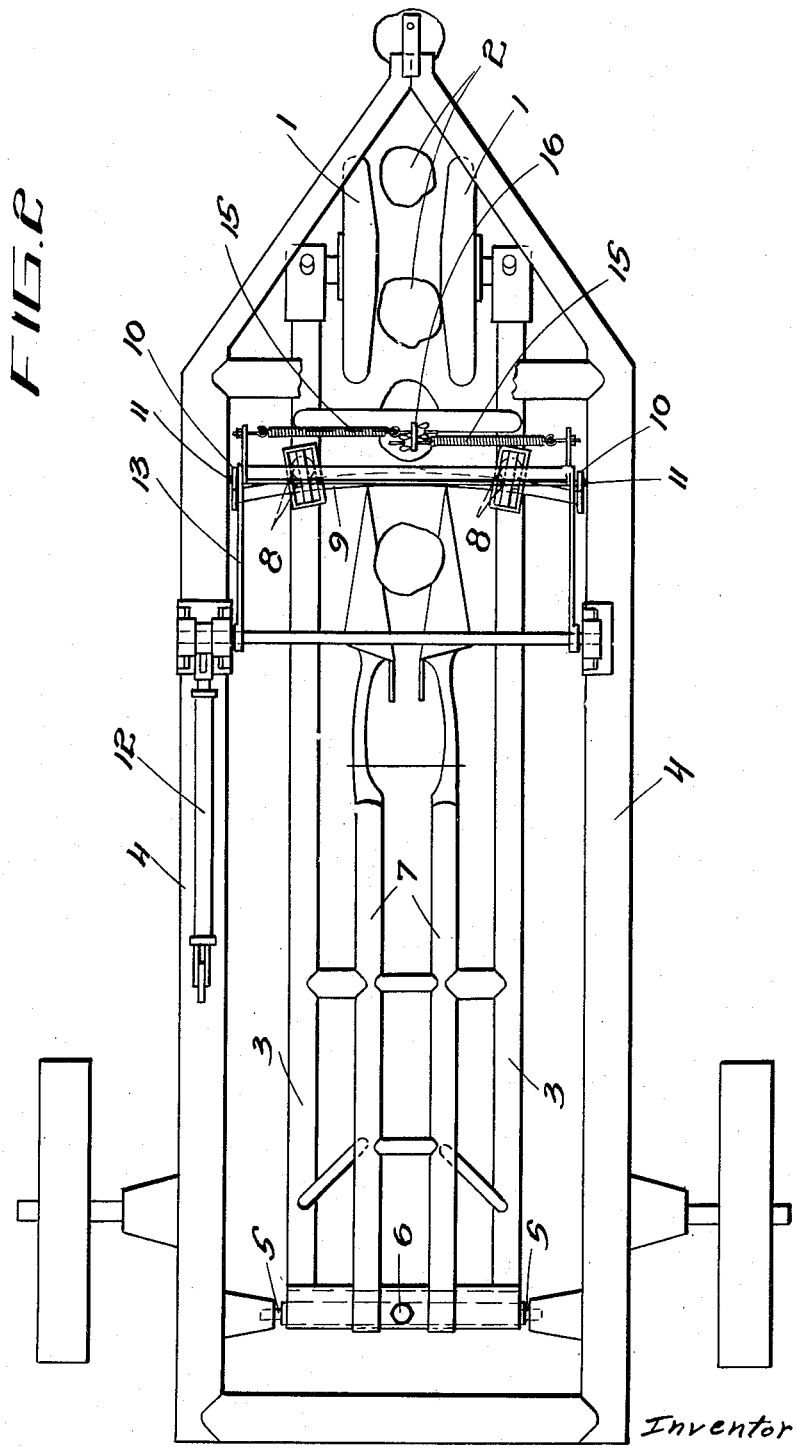

2,690,039

UNITED STATES PATENT OFFICE 2,690,039

LIFTING TYPE ROOT-CROP HARVESTER

Helge Gunnar Olsson, Landskrona, Sweden, assignor to Svenska Sockerfabriks Aktiebolaget, Malmo, Sweden, a corporation of Sweden Application September 5, 1950, Serial No. 183,133

Claims priority, application Sweden September 15, 1949

2 Claims. (Cl. 55—106)

1

This invention relates to root-crop harvesters and especially to beet harvesters. More particularly the invention relates to root-crop harvesters of the type having a root-crop pick-up unit.

The invention has for its object to provide a simple and reliable device for automatic adjustment of the pick-up unit of the root-crop harvester both vertically and laterally of the row of crops to be harvested.

For this purpose and such other purposes as will appear from the following detailed description, the invention is characterized first of all by the fact that in addition to its main frame the root-crop harvester has an elongated sub-frame which extends longitudinally of the main frame and supports the pick-up unit. Said sub-frame is mounted on the main frame for both lateral and vertical swinging movement, while the front end thereof is supported in working position by a pair of wheels riding on the ground on either side of the row of crops to be harvested. By engagement with the crops of the row, said wheels automatically adjust the sub-frame and the pick-up unit supported thereby both laterally and vertically after said row of crops, should the harvester not be driven in complete alignment with said row.

The invention will be described more in detail in the following, reference being had the accompanying drawings which illustrate an embodiment of the invention.

In the drawings:

Fig. 1 is a side elevation of the root-crop harvester, and

Fig. 2 is a plan view thereof.

The root-crop harvester is shown in the form of a steerable vehicle with wheels, the main frame 4 of said vehicle being supported at the front end by one or a pair of steering wheels (not shown). The vehicle may be coupled to a tractor as a trailing vehicle or pulled by horses or other draught-animals.

Referring now to the drawings, the root-crop harvester comprises a pair of control wheels 1 which ride on the ground on either side of, and adjacent, the row of crops 2 to be harvested. Said control wheels support the front end of an elongated sub-frame 3 which extends longitudinally of the main frame 4 and rearwardly of the control wheels a unit 7 for picking up the root crops after the topping thereof. At its rear end said sub-frame 3 is mounted on the main frame 1 for both vertical and lateral swinging movement. In the embodiment shown a transverse shaft 5 is rotatably mounted in the main

2 frame 4, and the sub-frame 3 is connected with this shaft 5 by means of a pivot bolt 6 which is at right angles to the shaft 5, so that the sub-frame 3 is vertically swingable about the shaft 5 and laterally about the bolt 6. The sub-frame 3 may be raised from its working position—in which its control wheels 1 ride on the ground—by means of a lifting device comprising a pair of lift arms 13 connected with a drive 12 and vertically swingably mounted on the main frame 4, and a roller track 9 having its ends suspended in said arms with a certain play by means of suspension members 10. Adjacent the control wheels 1 at the front end of the sub-frame 3 there are mounted rollers 8 which roll along the roller track 9 when the sub-frame 3 is swung laterally. The vertical play between the lift arms 13 and the roller track suspended therefrom and from which the sub-frame 3 is suspended by means of the rollers 8, may preferably be obtained by providing slots 11 in the members 10. Springs 15 acting upon the frame in opposite directions are fixed between a point 16 on the sub-frame 3 and for instance the members 10 and tend to hold the sub-frame 3 laterally centered in relation to the main frame 4.

It is not so easy to steer the harvester by means of its front steering wheels in exact alignment with the row of crops to be harvested. For a reliable work of the topping and pick-up units it is however of importance that they are exactly aligned with the row of crops during the pick-up operations and do not deflect therefrom towards any side. Furthermore it is of importance that the pick-up unit follows the ground very closely according as it rises or falls. Therefore a fine-adjustment of the pick-up unit both laterally and vertically after the row of crops should take place completely automatically for compensating the unavoidable shortcomings of the manual steering of the harvester along the row of crops. Thanks to the fact that the force which holds the root crops in the soil and which the control wheels 1 riding on either side of and engaging with the row of crops would have to overcome to effect a lateral deflection in relation to said row of crops, is greater than the force necessary to hold the pick-up unit 7 aligned with the row in question, the desired adjustment of said unit is realized in a simple and reliable manner by the above-described device. When tending to deflect from the row of crops owing to a less careful steering of the harvester along said row, the control wheels 1 will slide against the root crops and be forced to move laterally into correct alignment therewith, the sub-frame 3 and the pick-up unit 7 supported thereby being swung laterally about the bolt 6. This involves that as long as there are root crops for the control wheels 1 to pass on either side of and slide against, the pick-up unit 7 which is detachably secured on the sub-frame 3, will always be aligned with the row formed by these crops. If the deflection of the pick-up unit 7 towards either side in relation to the main frame 4 should become too large owing to careless driving of the harvester, the springs 15 aid in pulling the harvester laterally into correct alignment with the row of crops. In addition the springs 15 have the task of preventing the pick-up unit 7 from swinging over to either side when the control wheels 1 pass gaps in the row of crops by returning the sub-frame 3 with the pick-up unit 7 into intermediate position relatively to the main frame 4 and retaining it in this position.

The control wheels 1 are advantageously in the form of disks having suitably curved sides facing on to each other and the row of crops in order to obtain a good engagement with the crops. Furthermore, the control wheels 1 are given a carrying ability which is so adapted after the downwardly directed force acting upon the pick-up unit 7 that they are able to carry the pick-up unit 7 even though the groud is wet, and to follow the ground according as it rises or falls by riding thereon. In working position the sub-frame 3 as well as the pick-up unit 7 supported thereby have a certain limited freedom of vertical motion about the shaft 5 owing to the play existing because of the slots 11, and as a result therefrom and from the carrying ability of the control wheels 1 the latter also control the vertical position of the pick-up unit 7 in relation to the main frame 4 according to the rising and falling ground, so that the pick-up unit is constantly maintained at the working depth, to which it has been set by a vertical adjustment of the control wheels in relation to the sub-frame by means of the set screws 14. According as the control wheels 1 are vertically adjusted in relation to the sub-frame 3 the lifting device thereof can and should be so adjusted at the beginning of the crop unearthing or pick-up operation that the play, obtained by means of the slots 11 or otherwise, of the sub-frame in its lower (working) position is uniformly distributed upwards and downwards when the harvester is working on level ground. This distribution of the play may occasionally require a change of the adjustment of the lift arms of the device. For the transport of the harvester from place to place, the sub-frame 3 as well as the control wheels 1 and the pick-up unit 7 are raised from the ground by means of the lifting device.

What I claim and desire to secure by Letters Patent is:

1. A root-crop harvester in the form of a steerable vehicle, comprising a main frame supported on wheels for movement along the ground, a sub-frame extending longitudinally of said main frame, a universal joint conencting said sub-frame at its rear end with respect to the direction of travel to said main frame for lateral and vertical swinging movement, a root-crop pick-up unit carried by said sub-frame, a pair of control wheels on the front end of said sub-frame with respect to the direction of travel for supporting this end in working position, means for raising said sub-frame out of working position comprising lift arms on said main frame, slotted suspension members connected with said lift arms, a rod having its ends attached to said slotted suspension members, means connected with the front end of said sub-frame and movable along said rod to permit lateral movements of said sub-frame, said control wheels riding on the ground on either side of the row of crops to be harvested and engaging with the root crops of the row in question in order automatically to swing said sub-frame carrying the pick-up unit on said universal joint both laterally and vertically in relation to said main frame as the harvester moves along a row of crops.

2. A root-crop harvester in the form of a steerable vehicle, comprising a main frame supported on wheels for movement along the ground, a sub-frame extending longitudinally of said main frame, a universal joint connecting said sub-frame at its rear end with respect to the direction of travel to said main frame for lateral and vertical swinging movement, a root-crop pick-up unit carried by said sub-frame, a pair of control wheels on the front end of said sub-frame with respect to the direction of travel for supporting this end in working position, means for raising said sub-frame out of working position comprising lift arms on said main frame, slotted suspension members connected with said lift arms, a roller track having its ends attached to said slotted suspension members, rollers arranged on the front end of said sub-frame and movable on said roller track to permit lateral movements of said sub-frame, said control wheels riding on the ground on either side of the row of crops to be harvested and engaging with the root crops of the row in question in order automatically to swing said sub-frame carrying the pick-up unit on said universal joint both laterally and vertically in relation to said main frame as the harvester moves along a row of crops.

References Cited in the file of this patent

UNITED STATES PATENTS

| Number | Name | Date |
|---|---|---|
| 1,389,708 | Smith | Sept. 6, 1921 |
| 1,513,737 | Bohman | Nov. 4, 1924 |
| 2,247,293 | Flintjer | June 24, 1941 |
| 2,491,203 | Orelind | Dec. 13, 1949 |